3,441,982
APPARATUS FOR INJECTION BLOW MOULDING
Toshio Sagara, Masahiro Shoji, and Hiroshi Tsukahara, Numazu-shi, Japan, assignors to Toshiba Kikai Kabushiki Kaisha, Tokyo-to, Japan
Filed Nov. 9, 1965, Ser. No. 506,978
Int. Cl. B29c 1/00, 17/04
U.S. Cl. 18—5  4 Claims This invention relates to an apparatus for injection blow moulding a hollow article having a neck smaller in diameter than the main body of the article such as a bottle.

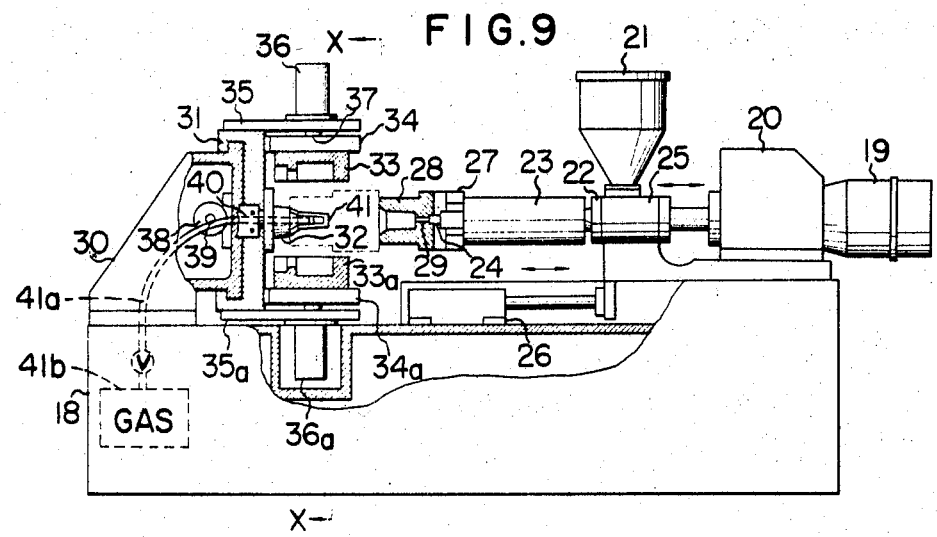
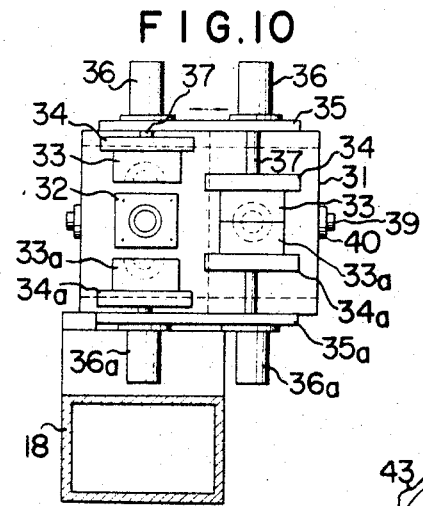
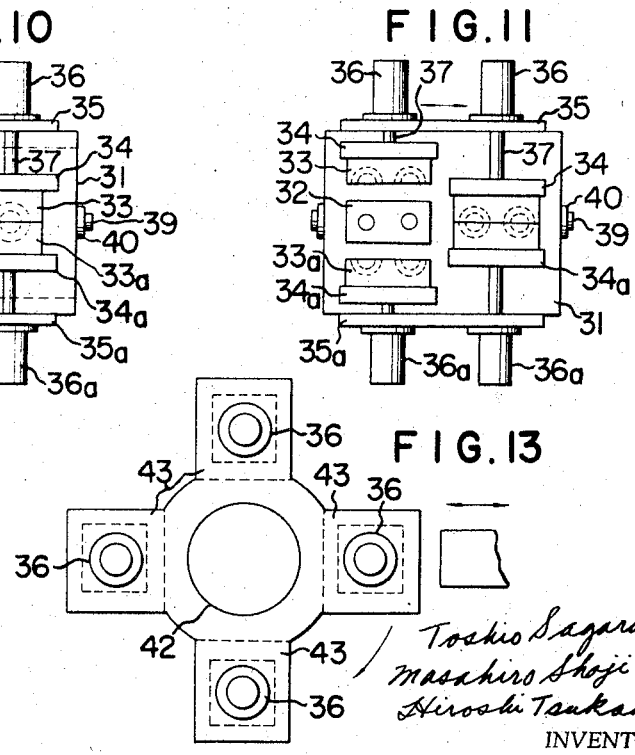
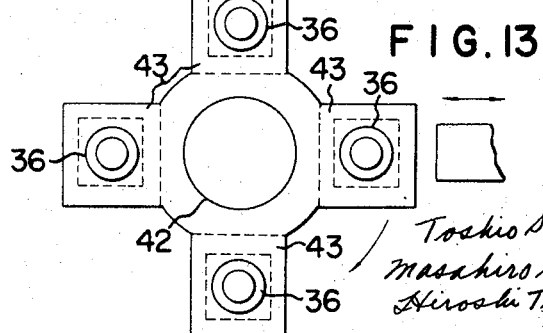

There have been proposed a number of methods for making such an article from plastic material by injection moulding or blow moulding technique. According to one method a hollow cylindrical parison of a thermoplastic material is formed by extrusion, then a pair of split type blow moulding mould members are closed to clamp the upper and lower ends of the parison, and then a fluid under pressure is introduced into said parison to expand it against the inner walls of the closed mould members.

This method, however, is disadvantageous in that the proportion of waste material, or portions of the moulded article which are required to be removed from the final product are relatively large, thus increasing the cost of manufacture. Further, because the wall thickness of the parison is uniform due to extrusion, the wall thickness of the finished article is not uniform. In other words, the wall thickness of the finished article at portions which were expanded to a greater extent is thinner than that of portions which were expanded to a less extent.

As a method for overcoming the difficulties mentioned above, the following method has been proposed which may be termed an injection blow moulding method. According to this method, an injection cavity is first formed by closing split type preliminary moulding mould members around a cylindrical core, and a plasticized moulding material is then injected into said mould cavity to form a blank on said core. After the preliminary moulding mould members are removed, the core and the blank formed thereon are enclosed by a pair of split type blow moulding mould members, and then a fluid under pressure is introduced into said blank through a passage extending through said core to expand the blank against the inner walls of the blow moulding mould members, thus forming the product. This method is also disadvantageous in that it requires a strong clamping mechanism for the preliminary moulding mould since it is of the split type.

Further, then the wall thickness of the neck is larger than that of the main body of the bottle, and when the neck is provided with projections, such as screw threads, on its outer periphery, not only is it difficult to precisely form such projections by the blow method, but also the cooling time required to cool and solidify such a thick neck limits the rate of production.

It is therefore the principal object of this invention to provide a novel apparatus for injection blow moulding a hollow article without incurring the various disadvantages mentioned above.

A further object of this invention is to provide a novel apparatus for injection blow moulding a hollow article of uniform wall thickness without the necessity of utilizing any clamping mechanism for the preliminary moulding mould.

A still further object of this invention is to provide a novel apparatus for injection blow moulding a bottle with a neck provided with projections, such as screw threads, on the peripheral surface thereof.

Another object of this invention is to provide a novel apparatus for making hollow articles at high speed by injection blow moulding technique.

The invention can be practiced by providing a moulding apparatus comprising a preliminary male mould and a cooperating female mould, means to combine said male and female moulds to form an injection cavity therebetween, means to inject a plasticized moulding material into said injection cavity through said female mould to form a hollow blank which is smaller than the final product, means to separate said male and female moulds while retaining said blank on said male mould, a pair of split type blow moulding mould members, means to close said blow moulding mould members around said male mould and said hollow blank, and means to introduce a fluid under pressure into said hollow blank through said male mould to expand said hollow blank against the inner surfaces of the blow moulding female mould members whereby to form said hollow article.

According to this invention, the female mould for injection moulding is not of a split type but of a single-piece type, so that there is no need of providing a clamping mechanism therefor. Moreover, as the blank is formed by injection moulding, the wall thickness at various portions thereof can be adjusted as desired to assure uniform wall thickness of the main body of the finished article.

Where it is desired to produce a bottle having a neck having projections or irregular surface on its outer periphery, such as screw threads, a pair of split type female mould members for moulding the neck portion are added for defining said injection cavity together with said male and female moulds. These added female mould members are maintained closed around the blank while the blow moulding mould members are closed around the blank to expand it. By this arrangement, neck portions of complex configuration can be precisely moulded. It is advantageous to provide a plurality of sets of preliminary moulding male moulds and associated blow moulds so that these sets are operated alternately, whereby to prepare the blank by using one set while blowing the blank by using another set, thus increasing the rate of production.

For a more complete understanding of this invention, reference may be had to the following detailed description in connection with the accompanying drawings in which like parts are designated by like reference numerals, and in which:

FIG. 9 is a side elevational view, partly in section and with parts cut away, showing a moulding machine embodying this invention;

FIG. 10 is a sectional view taken along the line X—X of FIG. 9;

FIG. 11 shows a front view of a modification of the parts shown in FIG. 10 wherein two moulds are used for each set of moulds;

FIG. 13 is a plan view of the turret shown in FIG. 12;

Before describing the invention in detail, certain typical conventional methods of making hollow articles from a thermoplastic material will be described by referring to FIGS. 1 to 8, inclusive, wherein FIGS. 1 through 4 schematically represent the principle of the blow moulding method.

Figure 1:
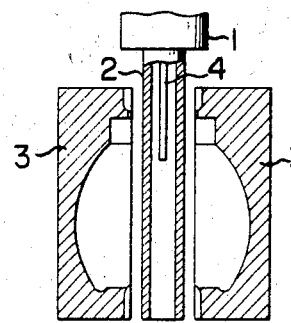
FIGS. 1 through 4 are schematic views, in longitudinal section, to illustrate various steps of a prior method of making hollow articles.
Figure 2:
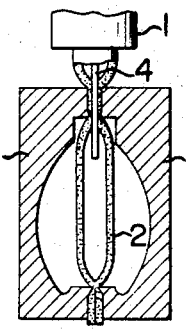
Figure 3:
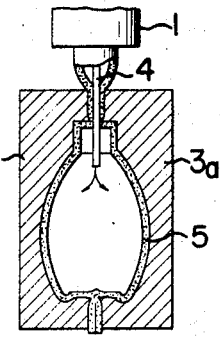
Figure 4:
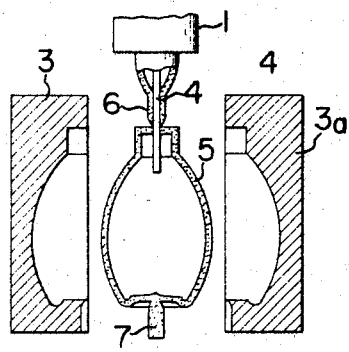

As shown in FIG. 1 a tubular parison 2 of a suitable thermoplastic resin is extruded from a nozzle 1 into a space defined by separatable split mould members 3 and $3_a$. When the lower end of the parison 2 reaches the lower ends of the split mould members 3 and $3_a$, these members are closed as shown in FIG. 2 to clamp the upper and lower ends of the parison between them to form a hollow bag shaped body. Air under pressure is then introduced into the bag shaped body through an air pipe 4 to expand the body against the inner walls of the mould members, thereby completing a product, as shown in FIG. 3. After the product is cooled, the split mould members 3 and $3_a$ are opened to remove the product 5, and undesired projections 6 and 7 at the top and the bottom are cut away to obtain a bottle shaped product 5.

However, according to this method the proportion of undesired portions 6 and 7 to the desired product 5 is relatively large, so that not only is the waste of material substantial, but this method also requires the additional step of cutting away these undesirable portions. Moreover, because of the uniform wall thickness of the extruded tubular parison 2, the wall thickness of the finished product may become too thin or too thick at some portions. Notwithstanding various efforts for providing a parison of configuration and wall thickness suitable for a particular product, it is still difficult to obtain satisfactory results.

As a technique to eliminate these defects, an injection blow moulding method has been proposed comprising the steps of premoulding a thermoplastic resin of a quantity sufficient to provide the final product by any suitable method such as injection moulding or another method and then putting the premoulded article into a blow moulding mould to shape it to the desired configuration. A typical example of this method is shown in FIGS. 5 through 8.

Figure 5:
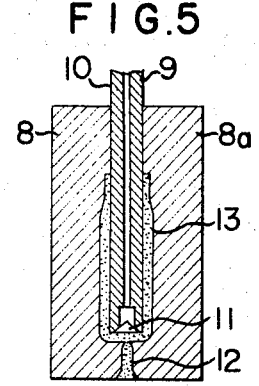
FIGS. 5 through 8 are similar views to illustrate various steps of another prior method of making hollow articles.
Figure 6:
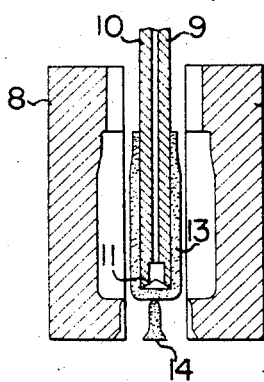
Figure 7:
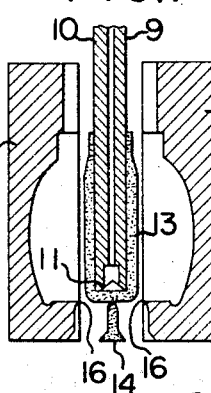
Figure 8:
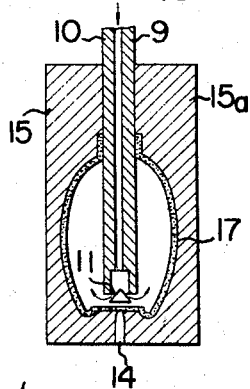

As shown in FIG. 5 a quantity of thermoplastic resin is injected through a port 12 into an annular cavity defined by a pair of split mould members 8 and $8_a$ (now closed) and a core 9 disposed therein to produce a blank 13 having a wall thickness and configuration appropriate for the final moulded product. Then, as shown in FIG. 6, mould members 8 and $8_a$ are opened to permit removal of the core 9 together with the blank 13 moulded thereon. The assembly of core and blank is then put into a space between split blow mould members 15 and $15_a$ as shown in FIG. 7. When the members 15 and $15_a$ are closed as shown in FIG. 8, the sprue 14 formed at the bottom of the blank 13 is sheared off by means of cooperating knife edges 16 and $16_a$ provided on the mould members at the bottom thereof. After the mould members 15 and $15_a$ are completed closed as shown in FIG. 8, gas under pressure is introduced in the blank 13 through a passage 10 extending through the core 9 and a valve 11 provided at the lower end of the core, whereby the blank 13 is expanded against the inner walls of the mould members 15 and $15_a$ to complete a product 17. After cooling and solidification of the product, the mould members are opened to permit withdrawal of the product through the bottom.

This method also has certain defects. More specifically, since the mould for forming the blank is of the split type, it is necessary to use a very high clamping force to withstand the high injection pressure used to mould the blank, thus requiring a bulky mould clamping mechanism of complicated construction. Further, this method requires a mechanism for transferring the core with the blank formed thereon, the moulding machine becomes more complicated.

As already mentioned, this invention contemplates the elimination of these disadvantages of prior methods.

Referring now to FIG. 9 which shows one example of the present injection moulding machine, the principal components parts thereof such as an injection section, a preliminary moulding section, and a blow moulding section are mounted on a supporting frame 18. Interlocked operations of these component parts are effected according to a schedule which is controlled and predetermined by limit switches, timers and the like as is well known in the art so as to repeat the operation cycle.

The injection section is mounted on a pedestal 25 and comprises, essentially, a screw drive motor 19, a variable speed reducing mechanism 20, a hopper 21 for supplying raw material, for example, a thermoplastic resin a heating cylinder 22, a temperature control device 23, an injection nozzle 24, a screw (which is contained in the heating cylinder and is not shown), and other related parts. All parts of the injection section are reciprocated horizontally by an oil pressure hydraulic device 26 connected to the pedestal 25. Details of the construction of these parts are not shown because the illustrated injection section is of a construction similar to that of the conventional in-line screw type injection moulding machine. At the inner end of the heating cylinder 22 there is mounted a metal mould supporting plate 27 to support a female mould 28 for preliminary moulding with its axis in alignment with the axis of the heating cylinder and with its injection passage 29 closely contacting an injection nozzle 24. Thus, the female mould 28 is reciprocated together with said injection section.

The preliminary moulding section and the blow moulding section are disposed to oppose the injection section. In this example, a pair of preliminary moulding male moulds 32 are disposed in parallel in the longitudinal direction of the moulding machine on a slide plate 31 which is so mounted as to be slidable in the transverse direction on a pressure receiving pedestal 30 fixed to the upper surface of the frame 18. Mould members 33 and $33_a$ of a split type blow mould are respectively secured to die plates 34 and $34_a$ on the opposite sides of the respective male moulds, said mould members being split along a plane containing the axis of the mould. These die plates 34 and $34_a$ are respectively connected to piston rods 37 of pistons contained in cylinders 36 and $36_a$ which are secured to cylinder plates 35 and $35_a$ and are supplied with air or oil under pressure. Thus, the blow moulds are opened and closed by the operation of piston-cylinder assemblies.

The slide plate 31 is arranged to be reciprocated in the transverse direction by an oil or air pressure cylinder 38, a piston rod 39 and a bracket 40 to alternately bring the axes of the pair of male moulds 32 to a position coinciding with the axis of the preliminary moulding female mould 28. A suitable passage and supply conduit 41a are provided to extend through the male moulds 32 so that they can serve as cores in the case of preliminary moulding and as tubes for introducing a gas under pressure from a supply of gas 41b for expanding the parison in the case of blow moulding. By mounting two sets of moulds on the slide plate 31 and by transversely reciprocating the slide it is possible to alternately use the sets, thus increasing the rate of production.

The process steps of forming a bottle by utilizing the above described moulding machine will now be described.

First, the left hand mould set shown in FIG. 10 is brought to the preliminary moulding position. In this case the blow moulding mould should be sufficiently opened so as not to interfere with the preliminary moulding mould. Then the female mould 20 for preliminary moulding which is mounted on the inner end of the injection cylinder is advanced together with the entire assembly of the injection section to couple with the male mould 32. A thermoplastic resin which has been plasticized and melted in the injection cylinder is then injected through the injection passage 29 to fill an annular injection cavity defined by the male mould and the preliminary moulding female mould thus moulding a blank 41. Then the preliminary moulding female mould 28 is retracted together with the injection section, leaving the blank on the male mould. Thereafter, the mould members 33 and 33a of the set are closed by the operation of piston-cylinder assemblies 36 and 36a to surround the male mould 32 and the blank 41 formed thereon. After complete closure of the mould members, gas under pressure is introduced into the interior of the blank through said passage extending through the male mould to expand the blank against the inner wall of the blow moulding mould. Then the product is cooled to solidify.

After it is confirmed that the right hand blow moulding mould is open and the product has been removed therefrom, the slide plate 31 is moved toward the left until the right hand male mould is brought to the operating position. Then the moulding operation of the blank is commenced by utilizing the right hand mould set according to similar process steps. After a suitable interval of time sufficient to assure cooling and solidification, the product formed in the left hand blow moulding mould is removed by opening said mould. Upon confirmation of the removal of the product, the slide plate 31 is moved to the right to bring the left hand mould set into the operating position to commence the moulding operation of the left hand mould set. The above described operations are repeated alternately to continue the moulding operation.

It will be obvious to those skilled in the art that the number and arrangement of the mould sets used as well as the operating mechanism therefor can be varied in various ways.

For example, while in the machine shown in FIGS. 9 and 10 one type of moulded article is produced with a pair of mould sets, in the modification shown in FIG. 11 each mould set is provided with two cores and the mould members 33 and 33a are also modified so that two products can be moulded simultaneously.

Figure 12:
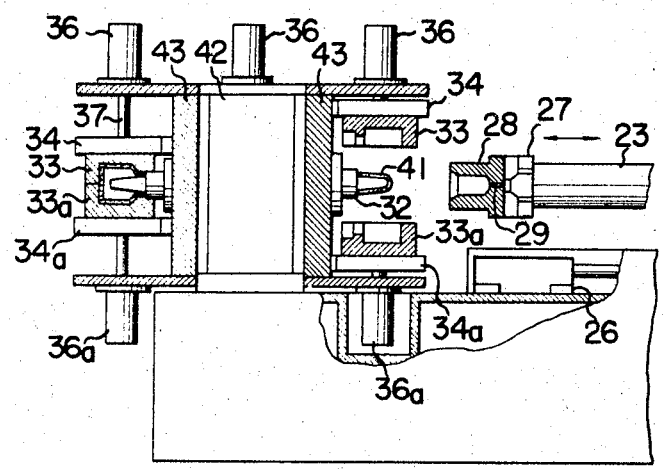
FIG. 12 is a side elevational view, partly in section and with parts cut away, of a turret type moulding machine embodying this invention.

In another modified embodiment of the invention as shown in FIGS. 12 and 13, the moulding machine has a turret type construction wherein a turn table 43 is mounted around an arbor 42 fixed to the frame 18 to support four regularly spaced blow moulding devices identical to that described hereinabove. The turn table 43 is sequentially rotated by 90 degrees by a well known turret mechanism, not shown.

As will be clear from the foregoing embodiments the preliminary moulding female mould is not of the split type but constructed as a single unitary body, so that the mould holding mechanism may be of simple construction and small size sufficient only to withstand the relatively small axial force without the necessity of utilizing a mould clamping mechanism as in the split type. Further, as each male mould is constructed to be positioned between split blow mould members associated therewith as soon as the preliminary moulding female mould is retracted from the male mould, it is possible to immediately close the blow moulding moulds to commence the blow moulding steps, thus effectively increasing the rate of production.

That is, in the conventional moulding machines as shown in FIGS. 5 through 8, inclusive, after the preliminary moulding female mould is separated from the cooperating male mould, it is necessary to transfer the male mould from a position between the preliminary moulding female mould members to a position between the blow moulding mould members by a certain means. This is inconvenient in that loss of time due to such transfer is substantial and that the preliminary moulded article is cooled during transfer.

Where the neck of the product or bottle has projections or irregular surfaces such as screw threads on its outer periphery, it is difficult to precisely mould these projections by the method and apparatus wherein the blank is expanded against the inner surface of the mould by pressurized gas. Moreover, as these necks are relatively massible, they require longer cooling time than the other portions or main body of the bottle, which requirement decrease, the rate of production. In the modification shown in FIGS. 14, 15 and 16, a split type female mould for forming the neck portion of the bottle is added to the moulding machine shown in FIGS. 9 and 10.

Figure 14:
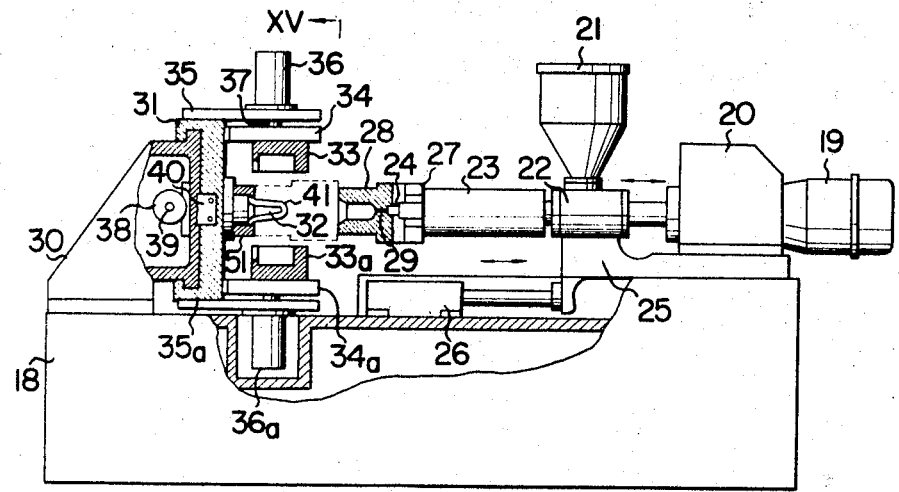
FIG. 14 is a side elevational view, partly in section and with parts cut away, of a modified moulding machine.
Figure 15:
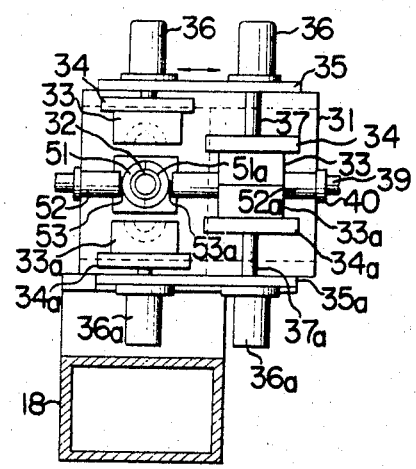
FIG. 15 is a sectional view taken along the line XV—XV of FIG. 14.
Figure 16:
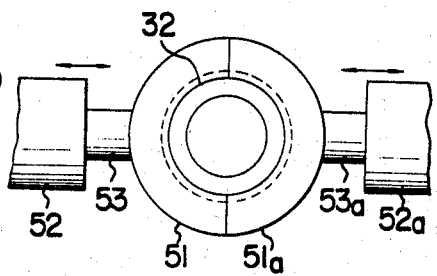
FIG. 16 is an enlarged view of a portion of FIG. 15.

Thus, as shown in FIGS. 14 to 16, inclusive, a pair of female mould members 51 and 51a for forming neck portions which are split along a plane including the axis of the mould are provided to surround the neck portion of each of the male moulds 32. These mould members 51 and 51a are opened and closed respectively by piston rods 53 and 53a connected to pistons contained in air or oil pressure cylinders 52 and 52a. Other component parts of this modified moulding machine are identical to those shown in FIGS. 9 and 10 so that they are designated by the same reference numerals.

In operation, the left hand male mould set is brought to the operating position with its associated female mould members 51 and 51a closed to surround the neck portion of the male mould 32. The injection section is advanced to cooperate with the mould 32 and mould members 51 and 51a to define an injection cavity, and thereafter the plasticized resin is injected through the injection passage 29 to fill the injection cavity, whereby a blank 41 is moulded. After this moulding, the injection section is retracted as shown in FIG. 14. In this state, the blank 41 remains on the male mould 32 with its moulded neck portion held by the mould members 51 and 51a which are still maintained closed. Then the blow moulding mould members 33 and 33a are operated to surround the portion of the blank 41 which is not covered by mould members 51 and 51a. Thereafter the blank is expanded as before.

The right hand mould set is then brought to the operating position and a blank is injection moulded in the same manner. After a suitable time for cooling and solidification of the blank, blow mould members 33 and 33a and female mould members 51 and 51a associated with the left hand male mould 32 are opened to permit removal of the product. Other steps proceed in the same manner as above described in connection with FIGS. 9 and 10. Thus, with this modified moulding machine, the accuracy of moulding of the moulded neck is improved.

Figure 19:
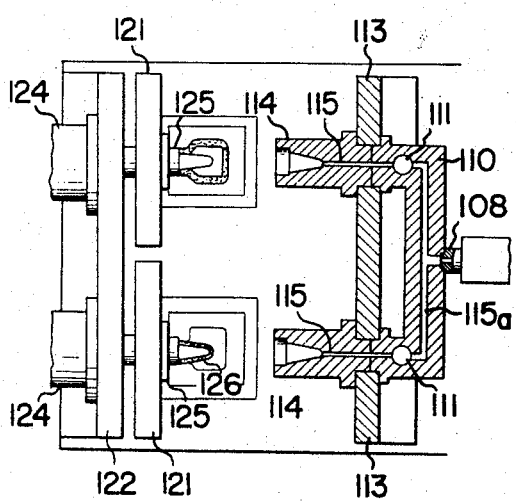
FIG. 19 is a plan view, partly in section, of a portion of a modification of the moulding machine shown in FIG. 18.
Figure 17:
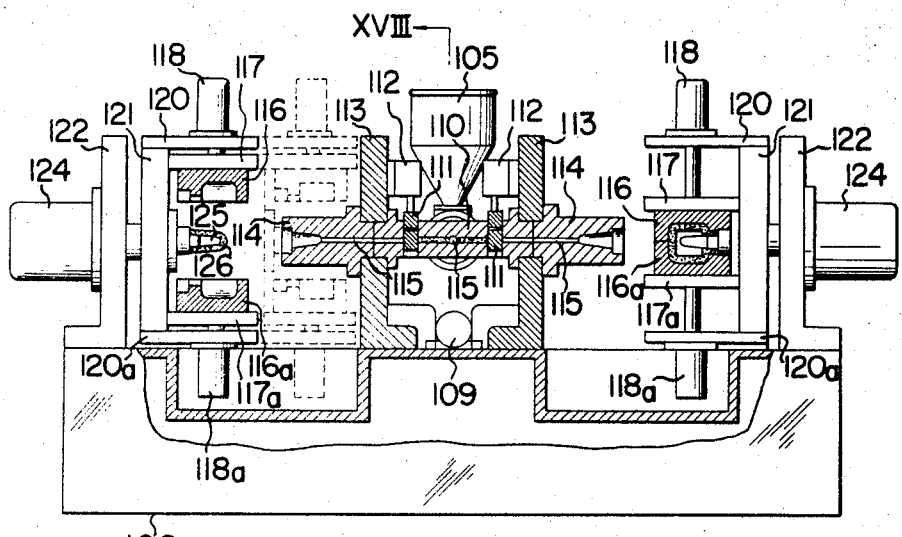
FIG. 17 is a side elevational view, partly in section and with parts cut away, of still another embodiment of this invention.
Figure 18:
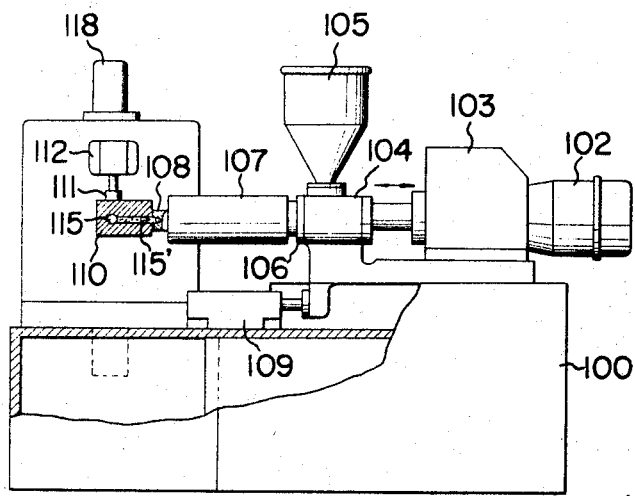
FIG. 18 is a sectional view taken along the line XVIII—XVIII of FIG. 17.

In still further modifications shown in FIGS. 17 through 19, the injection section is held stationary, while the preliminary moulding and blow moulding sections are moved toward and away from the injection section. More particularly, in the embodiment shown in FIGS. 17 and 18. The injection section comprises a screw driving motor 102, a speed reduction mechanism 103, a hopper 105 for supplying the raw material, a heating cylinder 106, a temperature control device 107, an injection nozzle 108 nd a screw (contained in the heating cylinder 106 and s not shown). These components are mounted on a support 104 which is reciprocated in the transverse direction in the upper surface of a base 100 by means of a piston-cylinder assembly 109.

As shown in FIG. 17 a pair of upright die plate 113 are secured to the base 100 on the opposite sides of the injection section to support respectively preliminary moulding female moulds 114 having injection passages 115 which are communicated with the injection nozzle 108 via a conduit 115ₐ formed in a manifold 110 which is urged against the nozzle 108 as shown in FIG. 16. Each of the injection passages 115 is provided with a switch valve 111 operated by a piston-cylinder assembly 112. A male mould 125 is mounted on the inner surface of a longitudinally movable plate 121 to oppose each of the preliminary moulding female moulds 114 in axial alignment therewith. If desired, a pair of such moulds 125 may be provided on each side of the moulding machine as in the case of the arrangements shown in FIGS. 10 and 15. Split type blow moulding mould members 116 and 116ₐ supported by die plates 117 and 117ₐ, respectively, are associated with each mould 125.

The mould members and die plates are reciprocated by piston-cylinder assemblies 118 and 118ₐ supported by cylinder plates 120 and 120ₐ which, in turn, are secured to the plates 121. As shown in FIG. 17, each of the movable plates 121 is reciprocated by a piston-cylinder assembly 124 fixed to a stationary supporting plate 122. The piston-cylinder assemblies 124 are also effective to provide a sufficient clamping force to the preliminary moulds formed by moulds 114 and 125. Again, the male moulds 125 are constructed to act as cores in the case of preliminary moulding and to act as tubes for introducing gas under pressure to expand blanks in the case of blow moulding.

The operation of the moulding machine for preparing bottles is as follows. First, the left hand male mould 125, as viewed in FIG. 17, is advanced until it engages the corresponding preliminary moulding female mould 114 so as to define an injection cavity. Then the switch valve 111 in the left hand passage 115 is opened to supply plasticized resin from the heating cylinder 106 to an annular injection cavity defined by the female mould 114 and the male mould 125 whereby to form a blank 126. When the charging of the plasticized resin is completed, the switch valve 111 is closed. Before the blank 126 thus formed is completely cooled to solidfy, the male mould 125 is retracted to the position shown in FIG. 17 by the action of the piston-cylinder assembly 124, and then the blow moulding mould members 116 and 116ₐ are closed by the action of the cylinders 118 and 118ₐ to enclose the male mould and the blank formed thereon.

When the mould members are completely closed, gas under pressure is introduced into the blank through a passage (not shown) extending through the male mould 125 to expand the blank against the inner walls of the mould members 116 and 116ₐ. The expanded blank is then cooled to solidify. During the foregoing period the right hand blow moulding mould members 116 and 116ₐ are opened to remove the produce, and then the right hand male mould 125 is advanced towards the right hand preliminary moulding female mould 114. Thereafter the right hand switch valve 111 is opened to repeat the same process steps as before. The right and left hand moulding sets are operated alternately.

In the arrangement shown in FIG. 19, which shows a plan view of a portion of a modification of the moulding machine shown in FIGS. 17 and 18, a pair of identical male moulds 125 are supported by die plate 121 which are laterally spaced and are respectively reciprocated by means of piston-cylinder assemblies 124 toward and away from a pair of laterally spaced preliminary moulding female moulds 114. These female moulds are communicated with a passage 115ₐ in a horizontal manifold 110 via injection passages 115 and switch valves 111, respectively. The injection nozzle 108 is urged against the manifold 110 to supply a plasticized resin to the female moulds 114. Although not shown, a pair of split type blow moulding mould members, identical to members 116 and 116ₐ shown in FIGS. 17, are associated with each male mould 125.

The operation of this modification is similar to that of the embodiment shown in FIGS. 15 and 16. Thus, male moulds 125 are used alternately as in the case of the left and right hand moulds 125 shown in FIGS. 17.

While the invention has been shown and described in terms of several preferred embodiments thereof, it will be obvious to those skilled in the art that many alternations and modifications may be made therein without departing from the spirit and scope of the inpention as defined in the appended claims.

What we claim is:

1. Apparatus for injection blow moulding a hollow article having a neck smaller than the main body of the article, such as a bottle, said apparatus comprising at least one cooperating preliminary male mould and a female mould, said preliminary female mould being an undivided type, means on which said preliminary male mould is mounted for holding said male mould stationary, mould moving means on which said preliminary female mould is mounted for relatively moving said preliminary female mould toward and away from said preliminary male mould coaxially of said moulds to form an injection cavity therebetween, injecting means connected to said preliminary female mould to inject a placticized moulding material into said injection cavity through said preliminary female mould to form a hollow blank which is smaller than said article, mould separating means coupled to said moulds to separate said preliminary male and female moulds while retaining said blank on said preliminary male mould, a pair of split type blow moulding mould members, said blow moulding members being concentric with said preliminary male mould and movable relative to said preliminary male mould only in a direction perpendicular to the direction of relative movement of said preliminary male and female moulds, mould moving means connected to said blow moulding mould members to hold said blow moulding members open and spaced apart from said preliminary male mould during the period wherein said hollow blank is being moulded and to close said blow moulding mould members around said preliminary male mould and said hollow blank, pressure fluid supply means connected to said preliminary male mould to introduce a fluid under pressure into said hollow blank through said preliminary male mould to expand said hollow blank against the inner surfaces of said blow moulding mould members, whereby said hollow article is formed.

2. An apparatus as claimed in claim 1, said apparatus further comprising split type female neck molding members and neck mould member moving means on which said neck moulding members are mounted for moving said neck moulding members toward said preliminary male moulding member to define a cavity therearound at the neck position of the article and for moving said neck moulding members away from said male moulding member, whereby a hollow article, such as a bottle, having a neck smaller than the main body of the article and having projections on the outer peripheral surface of the neck can be moulded.

3. An apparatus as claimed in claim 1 further comprising a base frame, a pressure receiving upright pedestal on said base frame on which said preliminary male mould and said blow moulding mould members are mounted, and said injecting means and said preliminary female mould is slidably mounted on said base frame.

4. An apparatus as claimed in claim 1 in which there are a plurality of preliminary male and a corresponding plurality of pairs preliminary of low moulding mould members, and said means on which said male and female moulds are mounted and said mould moving means for said blow moulding mould members are movable to alternately bring the female mould and the respective male moulds and the blow moulding members into cooperating relationship.

References Cited

UNITED STATES PATENTS

| | | |
|---|---|---|
| 2,298,716 | 10/1942 | Moreland et al. |
| 2,864,124 | 12/1958 | Strauss. |
| 3,337,667 | 8/1967 | Ninneman. |
| 3,357,045 | 12/1967 | Ninneman. |
| 2,872,700 | 2/1959 | Knowles. |
| 2,974,362 | 3/1961 | Knowles. |
| 3,305,892 | 2/1967 | Heider. |
| 3,330,894 | 7/1967 | Valyi. |
| 3,172,929 | 3/1965 | Santelli _____ 264—97 |
| 3,011,216 | 12/1961 | Gussoni _____ 264—97 |
| 3,111,711 | 11/1963 | Colomba _____ 18—5 |
| 3,112,522 | 12/1963 | Doyle _____ 18—5 |
| 3,137,748 | 6/1964 | Makowski _____ 264—97 |

WILBUR L. McBAY, *Primary Examiner.*

U.S. Cl. X.R.

264—97